Aug. 21, 1945.  A. R. FLINK  2,383,121
WHEEL DRIVEN DISTRIBUTOR TRUCK
Original Filed Aug. 6, 1941
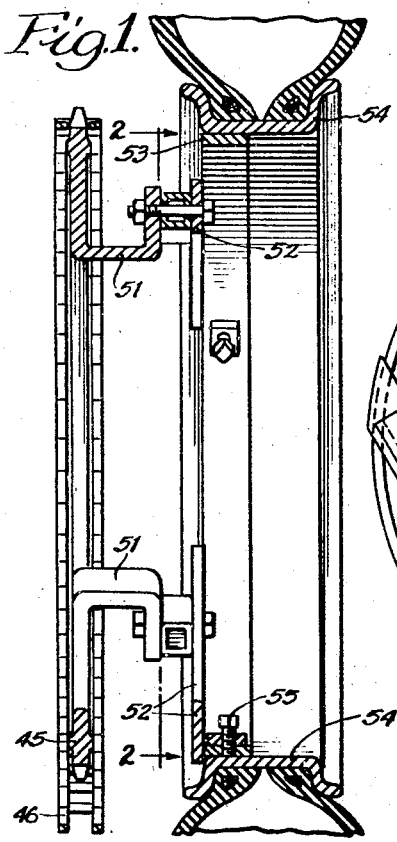
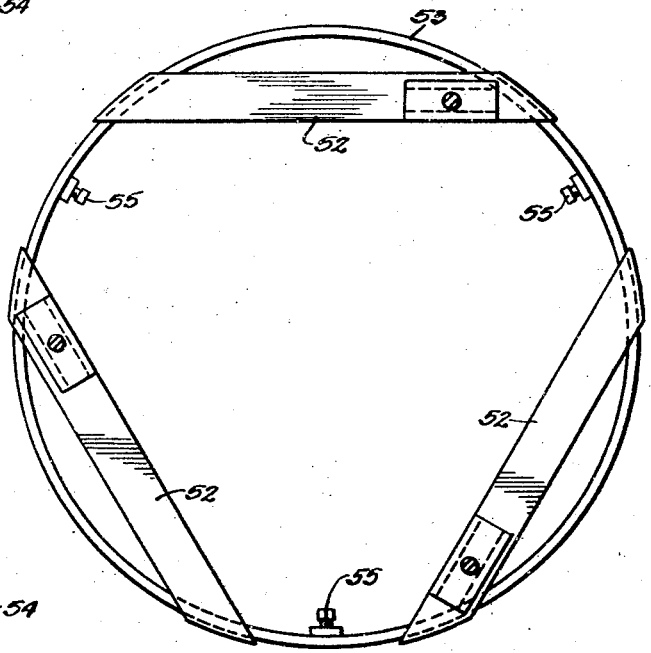
Inventor:
Allen R. Flink.
By McCaleb, Wendt & Dickinson
Attorneys.

Patented Aug. 21, 1945

2,383,121

UNITED STATES PATENT OFFICE 2,383,121

WHEEL DRIVEN DISTRIBUTOR TRUCK

Allen R. Flink, Streator, Ill.

Original application August 6, 1941, Serial No. 405,637, now Patent No. 2,359,412, dated October 3, 1944. Divided and this application May 26, 1944, Serial No. 537,417

7 Claims. (Cl. 301—6)

The present invention relates to improvements in distributor trucks intended for the transportation and distribution of finely divided, ground and powdered material, such as ground limestone, lime, ground phosphate, sand and other material.

This application is a division of prior application, Serial No. 405,637, filed August 6, 1941, now matured into Patent No. 2,359,412, issued October 3, 1944, for Distributor trucks, and the present application relates particularly to the features of the wheel drive of such a truck.

One of the objects of the invention is the provision of an improved wheel drive which is adapted to be removably applied to wheels of the double-tire type, such as are commonly used on trucks for the rear wheels, and which is adapted to drive a distributing mechanism that is removably applied to the truck in substitution for the rear gate or door of the truck.

Another object of the invention is the provision of an improved power connection for such a removable distributor mechanism by means of which the distributor mechanism may be operatively connected to the wheels of the truck.

Another object of the invention is the provision of such an improved drive mechanism to be driven from the wheels of the truck and adapted to permit relative movement between the distributor mechanism and the wheels, which is necessary when the box of the truck bearing the distributor mechanism is tilted upwardly to discharge the load.

Another object of the invention is the provision of such a drive mechanism which is adapted to be conveniently connected and disconnected from the usual driving position, so that the truck with the distributor mechanism attached and ready to operate may be driven from the place of loading to the place of discharge without actuating the distributing mechanism until the drive is connected at the place the material is to be distributed.

Another object of the invention is the provision of such an improved drive mechanism for distributors which is simple, sturdy, capable of economical manufacture and adapted to be used for a long period of time without necessity of repair or replacement.

Other objects and advantages of the invention will be apparent from the following description and the accompanying drawing, in which similar characters of reference indicate similar parts throughout the several views.

Referring to the drawing, of which there is one sheet,

Fig. 1 is a sectional plan view taken on a plane passing through the axis of the wheel showing the manner in which the drive element is connected to a conventional wheel truck;

Fig. 2 is a sectional detail view taken on the line 2—2 of Fig. 1 showing the structure of one of the attaching means.

The present rear wheel drive is particularly adapted to be used on distributor trucks of the type covered by my prior Patents Nos. 2,290,126 and 2,359,412.

The manner in wich the sprockets wheel 45 is mounted on the rear wheel of the truck is best shown in Fig. 1. The sprocket wheel 45 is provided with inwardly extending bracket members 51 which may be three in number. These bracket members are rigidly bolted to three chord members 52 which are rigidly connected to an annular member 53. This annular member is adapted to fit inside the rim 54 of a standard truck wheel in the manner shown in Fig. 1.

Three set screws 55 are mounted in radial relation on the ring member 53. To assemble the sprocket wheel 45 on any particular truck wheel, it is merely necessary to locate the annular member 53 inside the rim 54 in the manner shown in Fig. 1 and tighten the set screws 55. Removal of the sprocket wheel 45 is the work of a moment, it being merely necessary to loosen the set screws 55 and pull the sprocket wheel assembly out of the rim 54.

The set screws 55 are preferably provided with conically pointed or spherically pointed engaging ends, and the rims 54 are preferably provided with complementary recesses or sockets for the ends of the screws; that is, if the screw 55 has a conically pointed end, the rim 54 preferably has conical sockets for receiving these screws. These sockets may be formed in a very simple manner, as follows: The ring 53 is first properly located in the rim 54 and the screws 55 are driven downward into engagement with the inside of the rim 54. Then each screw may be tapped lightly with an appropriate hammer and tightened successively after each tapping with a wrench, thereby causing each screw end to form its own socket. A final tightening of the screws will result in the effective tight securement of the wheel drive to the rim 54.

The present driving sprocket is thus adapted to be secured very firmly to the rim of one of the rear wheels in such manner that the sprocket is concentric with the wheel and parallel to the plane of the wheel.

As the present distributing mechanism is adapted to be driven directly from the rear wheel of the truck, it does not require the use of any auxiliary engine and it may be operated in a most economical way. The distributing mechanism may be disconnected from its wheel drive while the material is being conveyed to the place it is to be distributed. The drive is simple, yet it is effective and it may be constructed with a minimum amount of material and labor. It is adapted to be used for a long period of time without necessity of repair or replacement.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a truck adapted to be provided with a distributor for material, in combination, a truck wheel including a wheel rim, a ring adapted to be inserted freely into said rim, set screws on said ring adapted to secure said ring directly to said rim, chord members on said ring, a sprocket wheel, and means for mounting said sprocket wheel on said chord members to locate said sprocket wheel clear of said rim.

2. In a wheel drive for a distributor of finely divided material, the combination of a wheel rim having an inner cylindrical surface, with a sprocket supporting member comprising an annular metal member having an outer cylindrical surface adapted to have a substantial fit inside said wheel rim, means for securing said annular member in said wheel rim, a driving sprocket wheel, and means for fixedly securing said sprocket wheel concentrically with respect to said rim on said annular member, said member carrying a plurality of transverse supporting members for supporting said sprocket wheel.

3. In a wheel drive for a distributing dump truck, the combination of a truck wheel including a wheel rim having an inner substantially cylindrical surface, with a rim engaging member comprising a strap of metal of substantially cylindrical form adapted to have a substantial fit inside said wheel rim in engagement with said inner cylindrical surface, a plurality of transversely extending metal frame members secured to said rim engaging member, a sprocket wheel carried by said transversely extending frame members and fixedly secured thereto in concentric position with respect to said rim engaging member and means for fixedly securing said rim engaging member to said rim.

4. In a wheel drive for a distributing dump truck, the combination of a truck wheel including a wheel rim having an inner substantially cylindrical surface, with a rim engaging member comprising a strap of metal of substantially cylindrical form adapted to have a substantial fit inside said wheel rim in engagement with said inner cylindrical surface, a plurality of transversely extending metal frame members secured to said rim engaging member, a sprocket wheel carried by said transversely extending frame members and fixedly secured thereto in concentric position with respect to said rim engaging member and means for fixedly securing said rim engaging member to said rim, said latter means comprising a plurality of set screws threaded into bores in said rim engaging member for engaging the rim.

5. In a wheel drive for a distributing dump truck, the combination of a truck wheel including a wheel rim having an inner substantially cylindrical surface, with a rim engaging member comprising a strap of metal of substantially cylindrical form adapted to have a substantial fit inside said wheel rim in engagement with said inner cylindrical surface, a plurality of transversely extending metal frame members secured to said rim engaging member, a sprocket wheel carried by said transversely extending frame members and fixedly secured thereto in concentric position with respect to said rim engaging member and means for fixedly securing said rim engaging member to said rim, said latter means comprising a plurality of set screws threaded into bores in said rim engaging member for engaging the rim, said rim being provided with sockets registering with the ends of said set screws for engagement of the set screws in said sockets.

6. In a wheel drive for a distributor truck, the combination of a wheel rim having an inner cylindrical surface, with a sprocket supporting member comprising an annular metal member having an outer cylindrical surface adapted to have a substantial fit inside said wheel rim, means for securing said annular member in said wheel rim, a driving sprocket wheel, and means for fixedly securing said sprocket wheel concentrically with respect to said rim on said annular member, said member carrying a plurality of transverse supporting members for supporting said sprocket wheel, said latter means including axially extending means whereby the sprocket wheel is supported in axially spaced relation to the rim to permit the chain engaging said sprocket to be located outwardly of the wheel and other parts of a truck upon which the wheel is mounted.

7. In a truck adapted to be provided with a distributor for material, in combination, a truck wheel including a wheel rim, a ring adapted to be inserted freely into said rim, set screws on said ring adapted to secure said ring directly to said rim, chord members on said ring, a sprocket wheel, and means for mounting said sprocket wheel on said chord members to locate said sprocket wheel clear of said rim, said rim having complementary sockets for receiving the ends of said set screws.

ALLEN R. FLINK.